United States Patent
Aimura et al.

(10) Patent No.: US 8,401,715 B2
(45) Date of Patent: Mar. 19, 2013

(54) VEHICLE PERIPHERY MONITORING DEVICE

(75) Inventors: Makoto Aimura, Saitama (JP);
Nobuharu Nagaoka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 35 days.

(21) Appl. No.: 13/265,598

(22) PCT Filed: Jan. 14, 2010

(86) PCT No.: PCT/JP2010/050313
§ 371 (c)(1),
(2), (4) Date: Oct. 21, 2011

(87) PCT Pub. No.: WO2010/125833
PCT Pub. Date: Nov. 4, 2010

(65) Prior Publication Data
US 2012/0041617 A1 Feb. 16, 2012

(30) Foreign Application Priority Data

Apr. 28, 2009 (JP) ................................ 2009-109080

(51) Int. Cl.
*G05D 1/00* (2006.01)

(52) U.S. Cl. ............ 701/1; 340/436; 340/435; 340/937; 340/904; 342/70; 342/175; 701/45

(58) Field of Classification Search .................... 701/45, 701/1, 31.4, 300, 301, 32.2; 340/436, 435, 340/932.2, 937, 903, 904; 180/271, 168; 356/4.01, 141.1; 348/135, 47; 342/70, 175
See application file for complete search history.

(56) References Cited

U.S. PATENT DOCUMENTS

| 6,452,533 | B1 * | 9/2002 | Yamabuchi et al. ............ 342/70 |
| 6,636,148 | B2 * | 10/2003 | Higuchi ........................ 340/436 |
| 7,586,400 | B2 | 9/2009 | Nagaoka et al. |
| 2002/0027503 | A1 * | 3/2002 | Higuchi ........................ 340/436 |

FOREIGN PATENT DOCUMENTS

| JP | 10-047954 A | 2/1998 |
| JP | 2007-213561 A | 8/2007 |
| JP | 2008-298533 A | 12/2008 |

OTHER PUBLICATIONS

Huber, J. et al.: "Quantitative Interpretation of Image Velocities in Real Time", Proceedings of the IEEE Workshop on Visual Motion, 1991, Oct. 7, 1991, pp. 211-216, Princeton, NJ USA.
Czarnecki, C A: "A Knowledge Based Real Time Collision Avoidance Method for Multi-Robot Systems", Proceedings Euriscon '94. European Robotics and Intelligent Systems Conference—European Conference on Robotics and Intelligent Systems, Aug. 22-25, 1994 Malaga, Spain, vol. 1, No. Stream A, Jan. 1, 1994, pp. 470-479.

* cited by examiner

*Primary Examiner* — Behrang Badii
(74) *Attorney, Agent, or Firm* — Carrier Blackman & Associates, P.C.; Joseph P. Carrier; William D. Blackman

(57) ABSTRACT

Provided is a vehicle periphery monitoring device having: a first distance calculating unit (25) which calculates a distance between a vehicle (10) and an object, using a parallax gradient of image sections of the same object among a plurality of images captured by infrared cameras (2R, 2L) at different times within a predetermined sampling interval; a vehicular velocity sensor (4) which detects a vehicular velocity of the vehicle (10); and a sampling interval setting unit (23) which sets the sampling interval shorter with the increase of the vehicular velocity of the vehicle (10).

2 Claims, 11 Drawing Sheets

VEHICLE PERIPHERY MONITORING DEVICE

TECHNICAL FIELD

The present invention relates to a vehicle periphery monitoring device configured to monitor a periphery of a vehicle on the basis of an image captured by an imaging unit mounted in the vehicle.

BACKGROUND ART

Hitherto, there has been disclosed a vehicle periphery monitoring device, for example, which is configured to calculate a variation rate on dimensions of image sections of the same object in time-series images captured by a single camera mounted in a vehicle and calculate a distance between the object and the vehicle on the basis of the variation rate (for example, refer to Japanese Patent Laid-open No. 2007-213561).

SUMMARY OF THE INVENTION

Problems to be Solved by the Invention

However, in the above-mentioned Japanese Patent Laid-open No. 2007-213561, the specific setting of a sampling interval of the images used in the calculation of the variation rate of the image sections of the object is not described. Moreover, in the calculation of the distance by use of the time-series images of the object, if the sampling interval for the time-series images is set constant, as the distance between the vehicle and the object becomes greater, the variation rate on dimensions of the images of the object would become smaller; thereby, as the object becomes further from the vehicle, the calculation accuracy of the distance would become lower.

Thus, when an object (a pedestrian, a bicycle, a big animal or the like) is detected in a detection area ranged with a predetermined distance from the vehicle, in order to ensure the calculation accuracy of the distance between the object positioned furthermost in the detection area and the vehicle, it is necessary to set the sampling interval for the time-series images at a longer time of some extent.

As mentioned in the above, if the sampling interval for the time-series images is set constant with a distant object serving as a reference, when calculating the distance to a close object, the sampling interval thereof would be unnecessarily longer. Thereby, there may have a time lag occurred in calculating the distance between the close object and the vehicle.

The present invention has been accomplished in view of the aforementioned problems, and it is therefore an object of the present invention to provide a vehicle periphery monitoring device configured to inhibit a time lag from occurring in calculating a distance between an object and a vehicle on the basis of time-series images of the object.

Means for Solving the Problems

To attain an object described above, the vehicle periphery monitoring device of the present invention is configured to monitor a periphery of a vehicle on the basis of an image captured by an imaging unit mounted in the vehicle.

A first aspect of the present invention comprises: a distance calculating unit configured to calculate a distance between a vehicle and an object by using a variation degree of predetermined elements of image sections of the same object among a plurality of images captured by the imaging unit at different times within a predetermined sampling interval; a vehicular velocity detecting unit configured to detect a vehicular velocity of the vehicle; and a sampling interval setting unit configured to set the sampling interval shorter as the vehicular velocity of the vehicle becomes slower.

According to the present invention, the sampling interval is set shorter by the sampling interval setting unit as the vehicular velocity of the vehicle becomes slower; thus, when the vehicular velocity of the vehicle is fast such as travelling on an express road and it is necessary to detect a distant object, the sampling interval can be set longer so as to ensure the calculation accuracy of the distance between the vehicle and the object. On the other hand, when the vehicular velocity of the vehicle is slow such as travelling on a narrow road in urban areas and it is necessary to detect a nearby object, the sampling interval can be set shorter so as to inhibit a time lag from occurring in calculating the distance.

In the first aspect of the present invention, the distance calculating unit calculates the distance between the vehicle and the object for every predetermined control cycle, and the sampling interval setting unit sets the sampling interval in a current control cycle shorter as the distance between the vehicle and the object calculated by the distance calculating unit in a previous control cycle becomes shorter.

According to the present invention, the distance between the vehicle and the object in the current control cycle is assumed to be roughly equal to the distance between the vehicle and the object calculated by the distance calculating unit in the previous control cycle. Thus, when the distance between the vehicle and the object becomes longer, it is necessary to make greater the variation degree of the predetermined elements between the images captured in the sampling interval by lengthening the sampling interval so as to maintain the calculation accuracy of the distance. On the opposite, when the distance between the vehicle and the object becomes shorter, since the variation degree of the predetermined elements between the images captured in the sampling interval becomes greater even though the sampling interval is set shorter, the calculation accuracy of the distance would become higher. Thereby, by setting the sampling interval in the current control cycle shorter as the distance between the vehicle and the object calculated in the previous control cycle becomes shorter via the sampling interval setting unit, it is not only possible to maintain the calculation accuracy of the distance by setting the sampling interval longer when the distance between the vehicle and the object is longer but also possible to inhibit the time lag from occurring in calculating the distance by setting the sampling interval shorter when the distance between the vehicle and the object is shorter.

In the first aspect of the present invention, the distance calculating unit calculates the distance between the vehicle and the object for each predetermined control cycle, and the sampling interval setting unit calculates an estimated distance between the vehicle and the object in a current control cycle by using the distance between the vehicle and the object calculated by the distance calculating unit in a previous control cycle, the vehicular velocity of the vehicle, and an elapsed time from the time point when the distance between the vehicle and the object is calculated in the previous control cycle to the present time; and sets the sampling interval in the current control cycle shorter as the estimated distance becomes shorter.

According to the present invention, when the distance between the vehicle and the object becomes longer, it is necessary to make greater the variation degree of the predetermined elements between the images captured in the sampling interval by lengthening the sampling interval so as to maintain the calculation accuracy of the distance. On the opposite, when the distance between the vehicle and the object becomes shorter, since the variation degree of the predetermined elements between the images captured in the sampling interval becomes greater even though the sampling interval is set shorter, the calculation accuracy of the distance would become higher. Thereby, by setting the sampling interval in the current control cycle shorter as the estimated distance becomes shorter via the sampling interval setting unit, it is not only possible to maintain the calculation accuracy of the distance by setting the sampling interval longer when the distance between the vehicle and the object is longer but also possible to inhibit the time lag from occurring in calculating the distance by setting the sampling interval shorter when the distance between the vehicle and the object is shorter.

A second aspect of the present invention is provided with a distance calculating unit configured to calculate a distance between the vehicle and an object by using a variation degree of predetermined elements of image sections of the same object among a plurality of images captured by the imaging unit at different times within a predetermined sampling interval for each predetermined control cycle; and a sampling interval setting unit configured to set the sampling interval in a current control cycle shorter as the distance between the vehicle and the object calculated by the distance calculating unit in a previous control cycle becomes shorter.

According to the present invention, the distance between the vehicle and the object in the current control cycle is assumed to be roughly equal to the distance between the vehicle and the object calculated by the distance calculating unit in the previous control cycle. Thus, when the distance between the vehicle and the object becomes longer, it is necessary to make greater the variation degree of the predetermined elements between the images captured in the sampling interval by lengthening the sampling interval so as to maintain the calculation accuracy of the distance. On the opposite, when the distance between the vehicle and the object becomes shorter, since the variation degree of the predetermined elements between the images captured in the sampling interval becomes greater even though the sampling interval is set shorter, the calculation accuracy of the distance would become higher. Thereby, by setting the sampling interval in the current control cycle shorter as the distance between the vehicle and the object calculated in the previous control cycle becomes shorter via the sampling interval setting unit, it is not only possible to maintain the calculation accuracy of the distance by setting the sampling interval longer when the distance between the vehicle and the object is longer but also possible to inhibit the time lag from occurring in calculating the distance by setting the sampling interval shorter when the distance between the vehicle and the object is shorter.

A third aspect of the present invention is provided with a distance calculating unit configured to calculate a distance between the vehicle and an object by using a variation degree of predetermined elements of image sections of the same object among a plurality of images captured by the imaging unit at different times within a predetermined sampling interval for each predetermined control cycle; and a sampling interval setting unit configured to calculate an estimated distance between the vehicle and the object in a current control cycle by using the distance between the vehicle and the object calculated by the distance calculating unit in a previous control cycle, a vehicular velocity of the vehicle, and an elapsed time from the time point when the distance between the vehicle and the object is calculated in the previous control cycle to the present time; and set the sampling interval in the current control cycle shorter as the estimated distance becomes shorter.

According to the present invention, when the distance between the vehicle and the object becomes longer, it is necessary to make greater the variation degree of the predetermined elements between the images captured in the sampling interval by lengthening the sampling interval so as to maintain the calculation accuracy of the distance. On the opposite, when the distance between the vehicle and the object becomes shorter, since the variation degree of the predetermined elements between the images captured in the sampling interval becomes greater even though the sampling interval is set shorter, the calculation accuracy of the distance would become higher. Thereby, by setting the sampling interval in the current control cycle shorter as the estimated distance becomes shorter via the sampling interval setting unit, it is not only possible to maintain the calculation accuracy of the distance by setting the sampling interval longer when the distance between the vehicle and the object is longer but also possible to inhibit the time lag from occurring in calculating the distance by setting the sampling interval shorter when the distance between the vehicle and the object is shorter.

MODE FOR CARRYING OUT THE INVENTION

Figure 1:
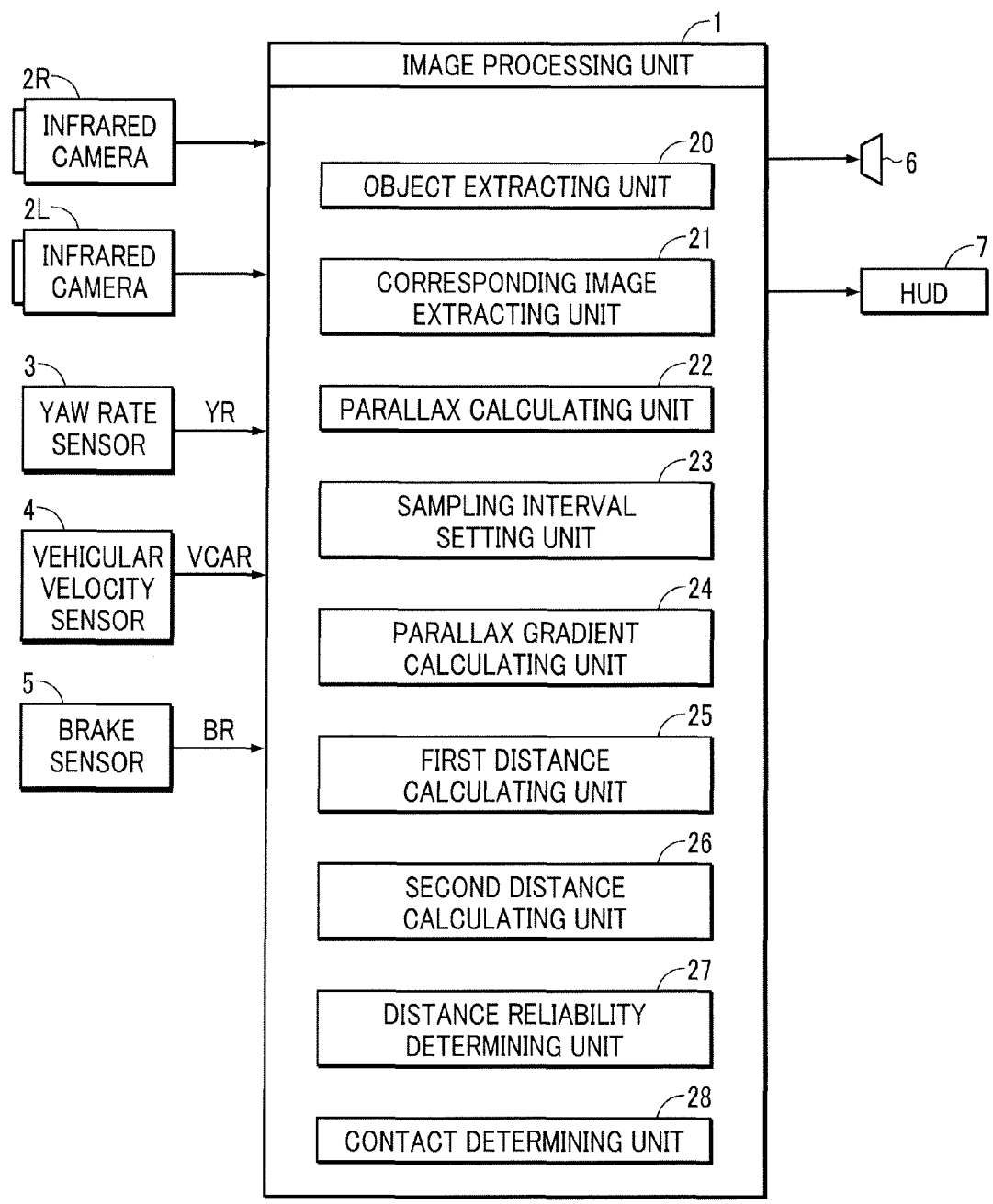
FIG. 1 is a configuration diagram of a vehicle periphery monitoring device according to the present invention.

Hereinafter, an embodiment of the present invention will be described in detail with reference to FIG. 1 to FIG. 11. FIG. 1 is a configuration diagram of a vehicle periphery monitoring device according to the present invention. The vehicle periphery monitoring device of the present invention is composed of an image processing unit 1. The image processing unit 1 is connected to infrared cameras 2R and 2L (equivalent to an imaging unit of the present invention) both capable of detecting far infrared rays, a yaw rate sensor 3 configured to detect a yaw rate of a vehicle, a vehicular velocity sensor 4 (equivalent to a vehicular velocity detecting unit of the present invention) configured to detect a travelling velocity of the vehicle, a brake sensor 5 for detecting a manipulated amount of a brake pedal by the driver, a speaker 6 for attracting attention via audio sounds, and a display device 7 for displaying images obtained by the infrared cameras 2R and 2L, and meanwhile visualizing an object which has a high contact possibility to the driver.

Figure 2:
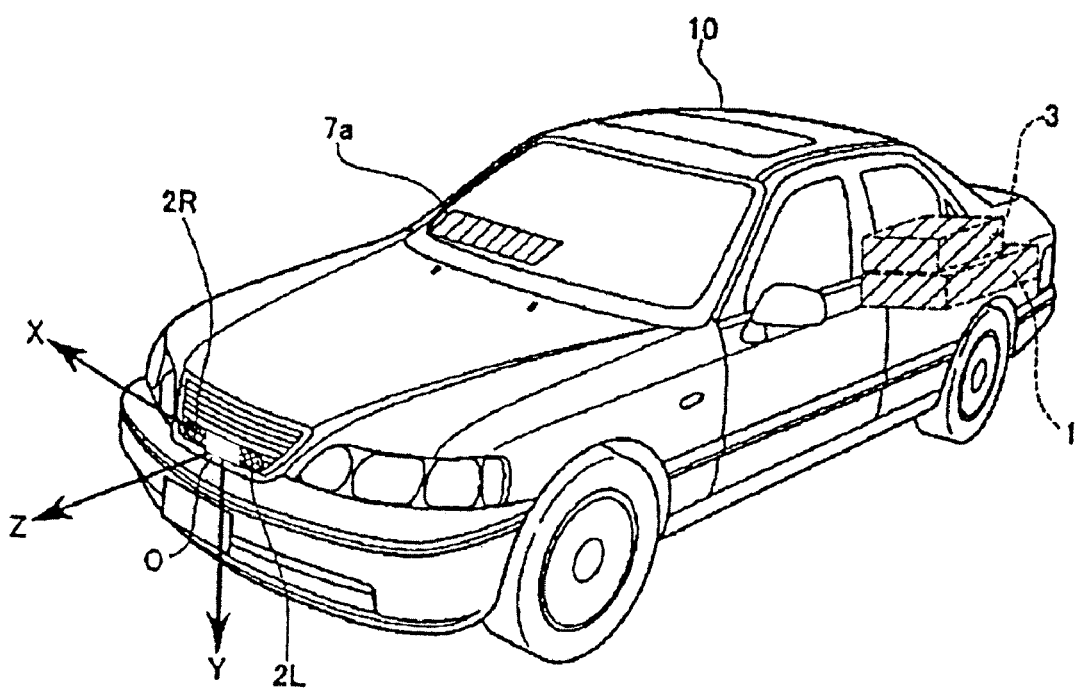
FIG. 2 is a diagram illustrating the vehicle periphery monitoring device illustrated in FIG. 1 being mounted in a vehicle.

With reference to FIG. 2, the two cameras 2R and 2L are disposed on the front portion of the vehicle roughly symmetrical to the central line in the width direction of the vehicle 10. The two infrared cameras 2R and 2L are fixed in such a way that the optical axes thereof are parallel to each other and the heights from the road surface to the two cameras 2R and 2L are equal. The infrared cameras 2R and 2L have a property of outputting image signals with higher levels (the luminance of the image signals becomes greater) when the temperature of an object to be photographed becomes higher. The display device 7 is disposed so that an image 7a is displayed on the windshield of the vehicle 10 in front of the driver.

With reference to FIG. 1, the image processing unit 1 is an electronic unit composed of a micro computer (not shown) or the like, and has a function causing the micro computer to convert analog image signals output from the infrared cameras 2R and 2L to digital data, store the digital data in an image memory (not shown), and perform various arithmetic computations on the front image of the vehicle stored in the image memory.

By causing the micro computer to execute a vehicle periphery monitoring program, the micro computer functions as an object extracting unit 20 configured to extract a first image section of an object in real space from a first image imaged by the infrared camera 2R, a corresponding image extracting unit 21 configured to extract a second image section correlated to the first image section from a second image imaged by the infrared camera 2L, a parallax calculating unit 22 configured to calculate a parallax between the first image section extracted by the object extracting unit 20 and the second image section extracted by the corresponding image extracting unit 21, a sampling interval setting unit 23 configured to set a sampling interval to sample the first image and the second image for the parallax calculating unit 22 to calculate the parallax in time series for the same object, a parallax gradient calculating unit 24 configured to calculate a parallax gradient which is a parallax variation rate per predetermined time interval on the basis of the parallax calculated by the parallax calculating unit 22 in time series for the same object, a first distance calculating unit 25 configured to calculate a distance between the vehicle 10 and the object on the basis of the parallax gradient, a second distance calculating unit 26 configured to calculate a distance between the vehicle 10 and the object on the basis of one parallax data, a distance reliability determining unit 27 configured to determine the reliability of the distance calculated by the first distance calculating unit 25, and a contact determining unit 28 configured to determine the contact possibility between the vehicle 10 and the object.

The monitoring process of the periphery of the vehicle 10 by the image processing unit 1 will be described with reference to the flow chart illustrated in FIG. 3. The image processing unit 1 carries out the process illustrated by the flow chart of FIG. 3 and monitors the periphery of the vehicle 10 in each predetermined control cycle.

Firstly, the image processing unit 1 inputs the analog signals of the infrared images output from the infrared cameras 2R and 2L at STEP 1, and converts the analog signals via A/D conversion to digitalized gray scale images and stores them in an image memory at STEP 2.

At STEP 1 and STEP 2, a gray scale image (referred to as a right image hereinafter) imaged by the infrared camera 2R and a gray scale image (referred to as a left image hereinafter) imaged by the infrared camera 2L are acquired. Since there is a deviation (parallax) between image sections of the same object in the right image and the left image in the horizontal direction, the distance between the vehicle 10 and the object in real space can be calculated according to the parallax.

At subsequent STEP 3, the image processing unit 1 performs a binarization processing (pixels having luminance equal to or greater than a threshold are interpreted as 1 (white), otherwise as 0 (black)) on the right image serving as a reference image to generate a binary image. The process from STEP 4 to STEP 6 is carried out by the object extracting unit 20. At STEP 4, the object extracting unit 20 runs length data conversion on the image section of each white area contained in the binary image (line data of continuous white pixels in x (horizontal) direction of the binary image). At STEP 5, the object extracting unit 20 labels lines having overlapped portions in the binary image in y (vertical) direction as one image section, and extracts the labeled image section as a candidate image of the object to be monitored at STEP 6.

At STEP 7, the image processing unit 1 calculates the center of gravity G, the superficial area S and the aspect ratio (ASPECT) of the circumscribed quadrangle for each candidate image. Since the specific calculation method is as common as described in, for example, Japanese Patent Laid-open No. 2001-6096 or the like, the description thereof is omitted here Thereafter, the image processing unit 1 carries out the process from STEP 8 to STEP 9 and the process from STEP 20 to STEP 22 concurrently.

At STEP 8, the image processing unit 1 carries out identity determination on the image sections extracted from the binary images which are obtained from the infrared cameras 2R and 2L every predetermined sampling period, and stores the time-series data of positions (positions of the center of gravity) of the image sections which have been determined to be of the same object (time interval tracking). At STEP 9, the image processing unit 1 reads in the vehicular velocity VCAR detected by the velocity sensor 4 and the yaw rate YR detected by the yaw rate sensor 3, and calculates the turning angle θr of the vehicle 10 by integrating the yaw rate YR over time.

Figure 4:
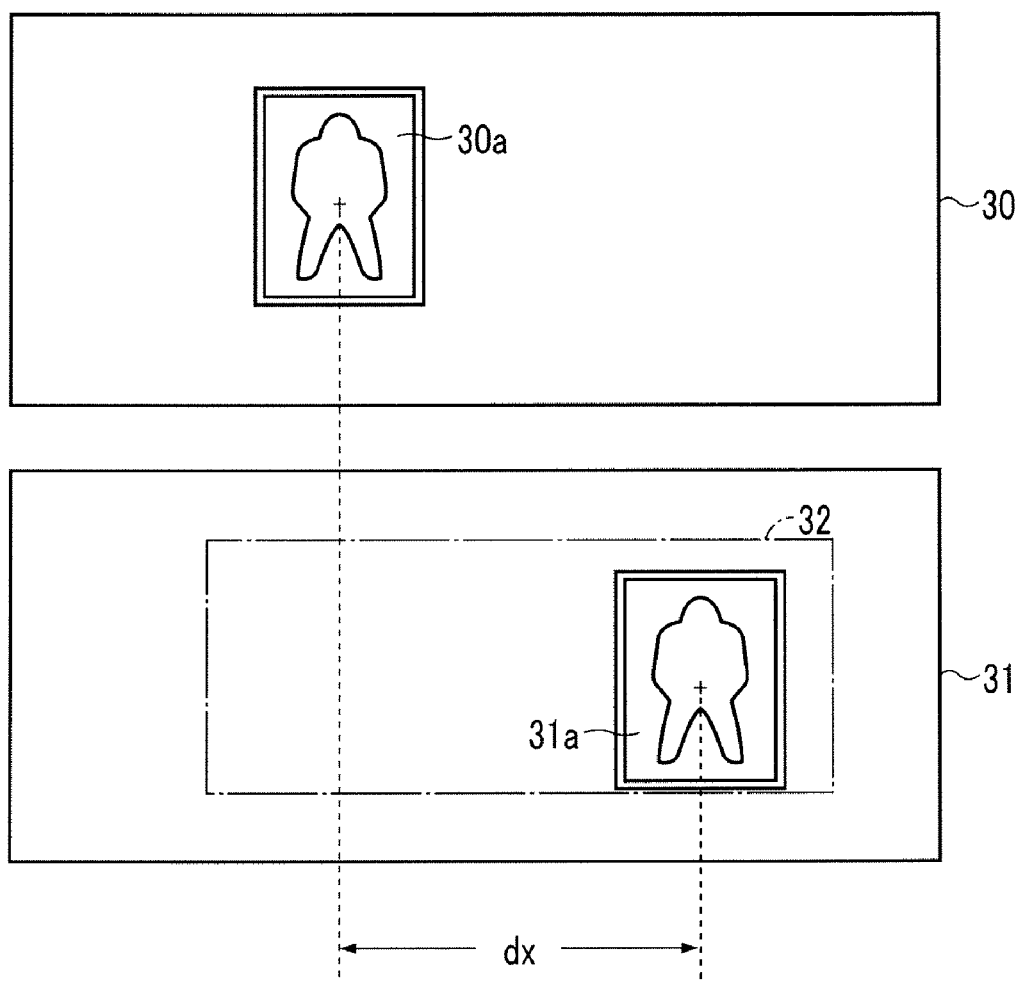
FIG. 4 is an explanatory diagram illustrating an image extraction process by a corresponding image extracting unit and a parallax between extracted images.
Figure 5:
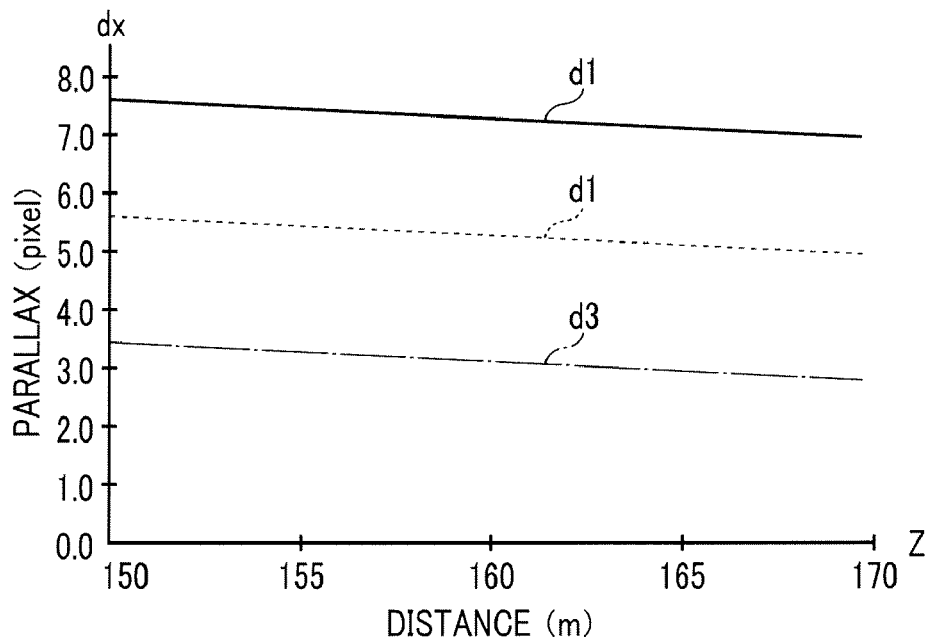
FIG. 5 is an explanatory diagram illustrating the effect of a parallax offset and the calculation of a theoretical parallax based on a parallax gradient.
Figure 5:
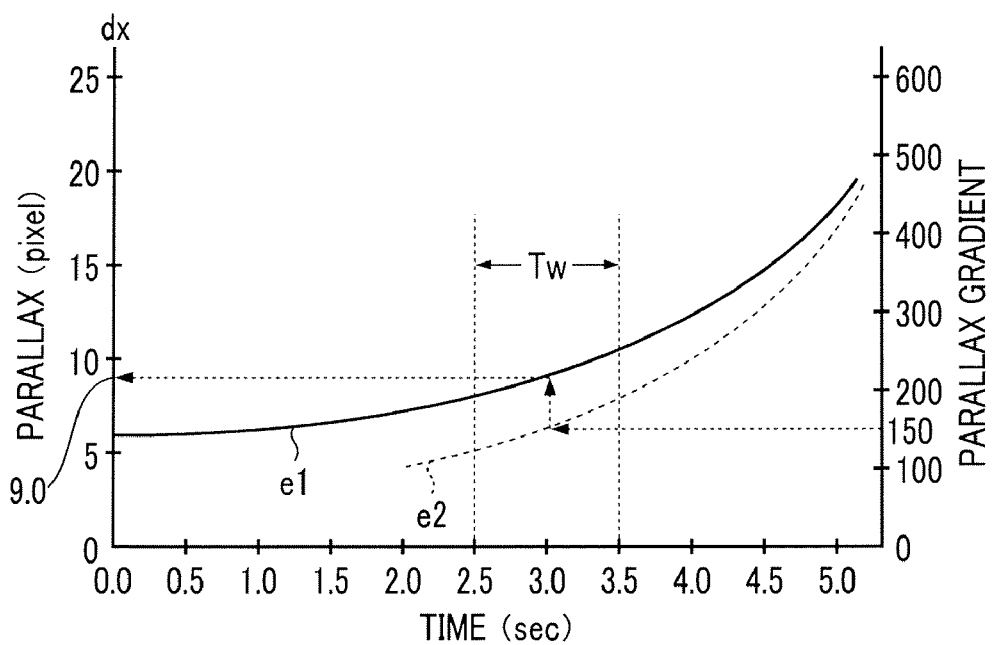

The process from STEP 20 to STEP 21 is performed by the corresponding image extracting unit 21. With reference to FIG. 4, at STEP 20, the corresponding image extracting unit 21 selects one image of the object from the candidate images extracted by the object extracting unit 20, and extracts from the gray scale image 30 of the right image a searching image 30a (an image having the entire area enclosed by the circumscribed quadrangle in the selected candidate image). Subsequently, at STEP 21, the corresponding image extracting unit 21 sets a searching area 32 for searching an image corresponding to the searching image 30a from the gray scale image 31 of the left image, and extracts therefrom a corresponding image 31a according to a computation of correlation relative to the searching image 30a.

The process at STEP 22 is carried out by the parallax calculating unit 22. Herein, the parallax calculating unit 22 calculates the difference between the position of the center of gravity of the searching image 30a and the position of the center of gravity of the corresponding image 31a as the parallax dx, and the procedure moves to STEP 10.

At STEP 10, the image processing unit 1 performs a distance calculating process for calculating the distance between the vehicle 10 and the object corresponding to the searching image 30a and the corresponding image 31a in real space. The distance calculating process will be described hereinafter.

STEP 11 to STEP 15 and STEP 30 are performed by the contact determining unit 28. At STEP 11, the contact determining unit 28 converts the coordinate (x, y) of the searching image 30a and the distance z from the vehicle 10 to the object calculated at STEP 10 to real spatial coordinate (X, Y, Z) and calculates the positional coordinate of the object corresponding to the searching image 30a in real space. As illustrated in FIG. 2, the real spatial coordinate (X, Y, Z) is defined in such a way that the central point between the mounting positions of the infrared cameras 2R and 2L is set as the origin O, the width direction of the vehicle 10 is set as X direction, the vertical direction is set as Y direction and the frontal direction of the vehicle 10 is set as Z direction. The image coordinate is defined by setting the central point of the image as the origin, the horizontal direction as x direction and the vertical direction as y direction.

At STEP 12, the contact determining unit 28 performs turning angle correction for correcting the positional deviation in the image due to the turning of the vehicle 10. At STEP 13, the contact determining unit 28 calculates the relative motion vector between the object and the vehicle 10 on the basis of the time-series positional data of the same object in real space obtained from a plurality of images imaged in a predetermined monitoring period after the turning angle correction has been performed on the time-series positional data of the same object.

The specific calculation methods of the real spatial coordinate (X, Y, Z) and the motion vector of the object are omitted here since they have been described in detail in Japanese Patent Laid-open No. 2001-6096 mentioned above.

At STEP 14, the contact determining unit 28 determines the contact possibility between the vehicle 10 and the object and executes an attention-attraction determining process to determine whether or not the attention-attraction is necessary. When it is determined that it is necessary to perform the attention-attraction according to the attention-attraction determining process, the process branches to STEP 30 where the attention-attracting audio sounds are output from the speaker 6 and the attention-attracting messages are displayed on the display device 7. On the other hand, when it is determined that it is unnecessary to perform the attention-attraction according to the attention-attraction determining process, the process returns to STEP 1, the image processing unit 1 does not perform the attention-attraction.

In the attention-attraction determining process, the image processing unit 1 determines the contact possibility of the object to the self vehicle 10 in a given time, whether or not the object is in a contiguity determination region set around the self vehicle, the contact possibility when the object enters the contiguity determination region from outside the contiguity determination region and have contact to the self vehicle 10, whether or not the object is a pedestrian, whether the object is an artificial structure or the like so as to determine whether it is necessary to perform the attention-attraction.

The specific contents of the attention-attraction determining process are omitted here since they have been described in detail in Japanese Patent Laid-open No. 2001-6096 mentioned above as the alarm determining process.

Hereinafter, the description will be carried out on the distance calculating process at STEP 10 of FIG. 3 with reference to FIG. 5 to FIG. 11. As illustrated in FIG. 4, for the same object in real space, if the parallax dx between the searching image 30a extracted from the right image and the corresponding image 31a extracted from the left image 31 is calculated out, the distance Z from the vehicle 10 to the object can be basically calculated according to the relational expression (1) below.

[Relational expression 1]

$$Z = \frac{f}{p} \cdot \frac{D}{dx} \tag{1}$$

Wherein, Z: the distance between the vehicle 10 and the object, f: the focal length of the infrared cameras 2R and 2L, p: the pixel pitch of the infrared cameras 2R and 2L, D: the baseline length of the infrared cameras 2R and 2L, and dx: the parallax.

However, in practical, due to the following reasons, such as (a) the effect of vibration from the vehicle 10 in travelling, (b) the aiming precision when mounting the infrared cameras 2R and 2L on the vehicle 10, (c) the effect of the correlation calculation when extracting the image sections of the same object by the corresponding image extracting unit 21, there exists an error between the actual distance from the vehicle to the object (actual distance) and the distance calculated according to the above relational expression (1) (calculated distance).

As shown by the following relational expression (2), the error between the actual distance and the calculated distance affects the relational expression (1) mentioned above as a parallax offset α.

[Relational expression 2]

$$Z = \frac{f}{p} \cdot \frac{D}{dx + \alpha} \tag{2}$$

Especially, as the distance Z from the vehicle 10 to the object becomes longer, the parallax dx becomes smaller, the effect of the parallax offset α on the above relational expression (2) becomes remarkable. Thereby, there arises an inconvenience that the determination accuracy of the contact possibility between the object and the vehicle 10 performed by the contact determining unit 28 by the usage of the calculated distance would be deteriorated.

FIG. 5(a) illustrates the relationship between the distance Z and the parallax dx when the vehicle 10 is travelling, for example, at 72 km/h with the parallax dx being set as the vertical axis and the distance Z from the vehicle 10 to the object being set as the horizontal axis. In the drawing, d1 represents the situation where the parallax offset α=0, d2 represents the situation where the parallax offset α=−2 (pixel), and d3 represents the situation where the parallax offset α=−4 (pixel).

It is obvious from FIG. 5(a) that since the parallax dx corresponding to the distance varies according to the parallax offset α, the calculation error of the distance occurs. For example, when the distance from the actual vehicle 10 to the object is 150 m, the calculated distance becomes 205 m if the parallax offset α=−2 (pixel) and the calculated distance becomes 322 if the parallax offset α=−4 (pixel).

However, the parallax gradient does not vary with the parallax offset. Thereby, the first distance calculating unit 25 calculates the parallax gradient on the basis of the parallax time-series data and calculates the distance from the vehicle 10 to the object by using the parallax gradient, thereby, to eliminate the effect of the parallax offset α.

The parallax between the image sections of the same object in the right image and the left image corresponds to the predetermined elements of image sections of the same object in the present invention. The parallax gradient calculated from the parallax time-series data corresponds to the variation degree of the predetermined elements in the present invention.

Figure 6:
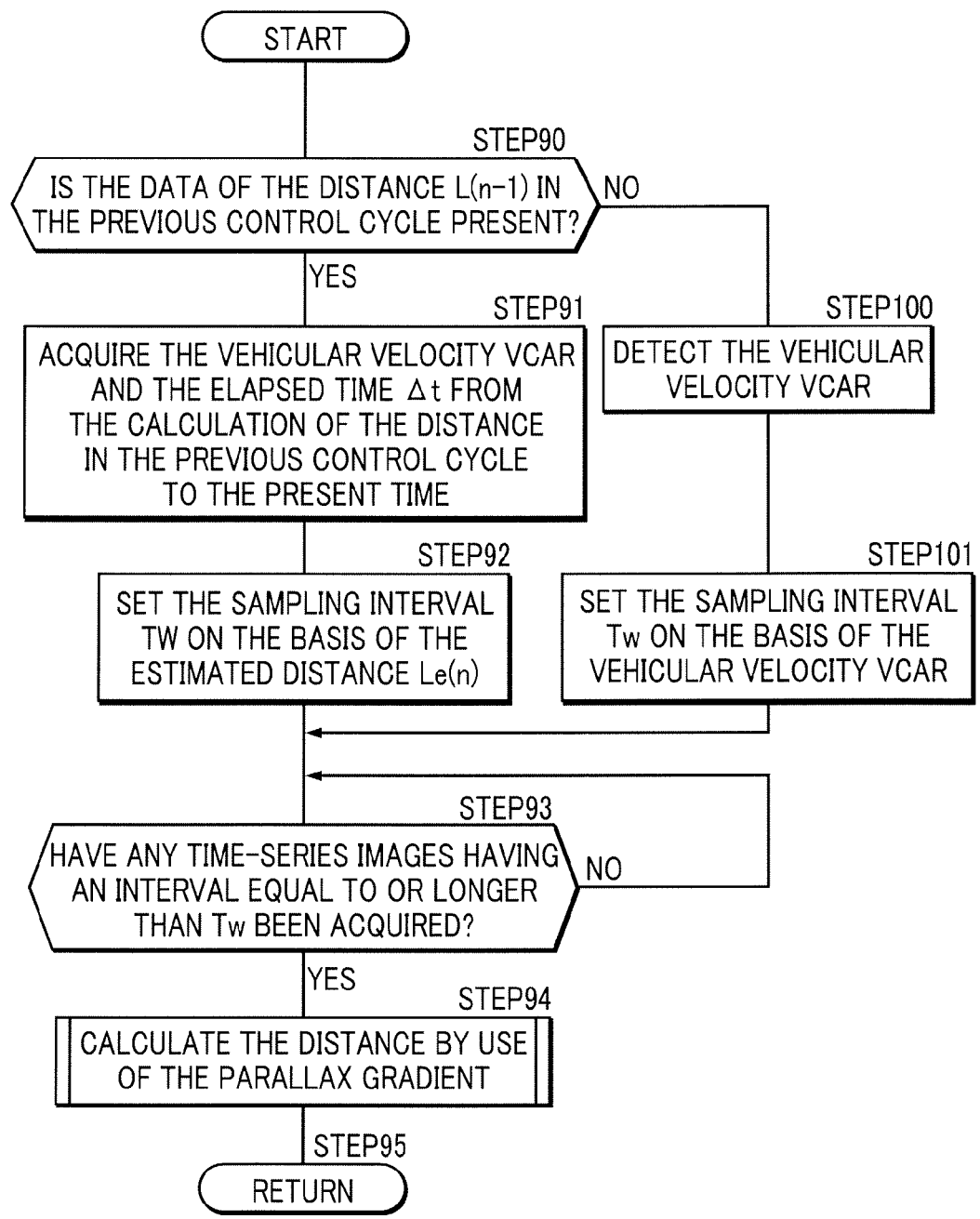
FIG. 6 is a flow chart illustrating a process of setting a sampling interval.
Figure 7:
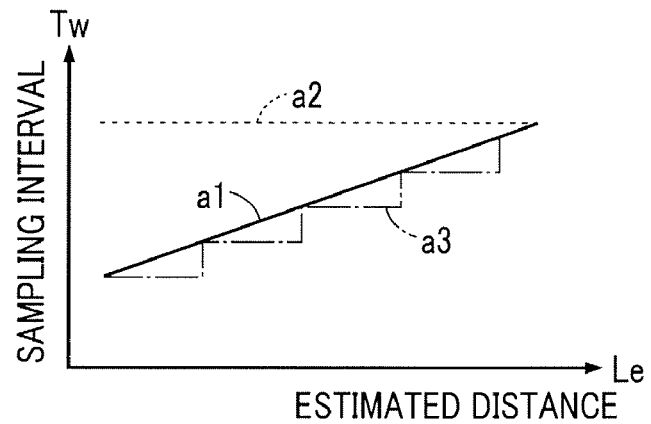
FIG. 7 is an explanatory diagram illustrating a setting method for the sampling interval.
Figure 7:
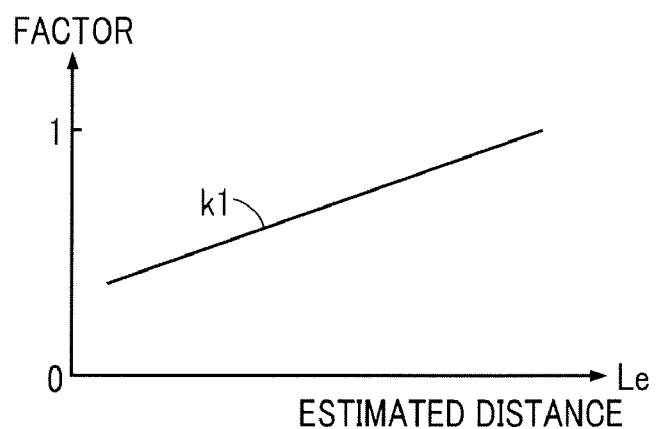
Figure 7:
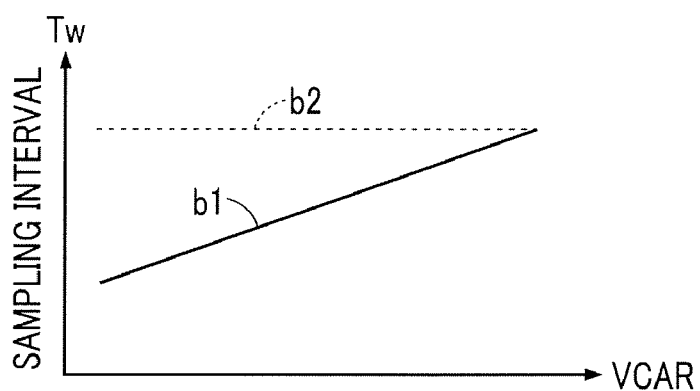

Thereafter, the sampling interval setting unit 23 sets sampling intervals for acquiring the parallax time-series data used in the calculation of the parallax gradient according to the flow chart illustrated in FIG. 6. At STEP 90, the sampling interval setting unit 23 determines whether or not the data of distance L(n−1) between the object and the vehicle 10 calculated in the previous control cycle is stored in a memory (not shown).

Figure 3:
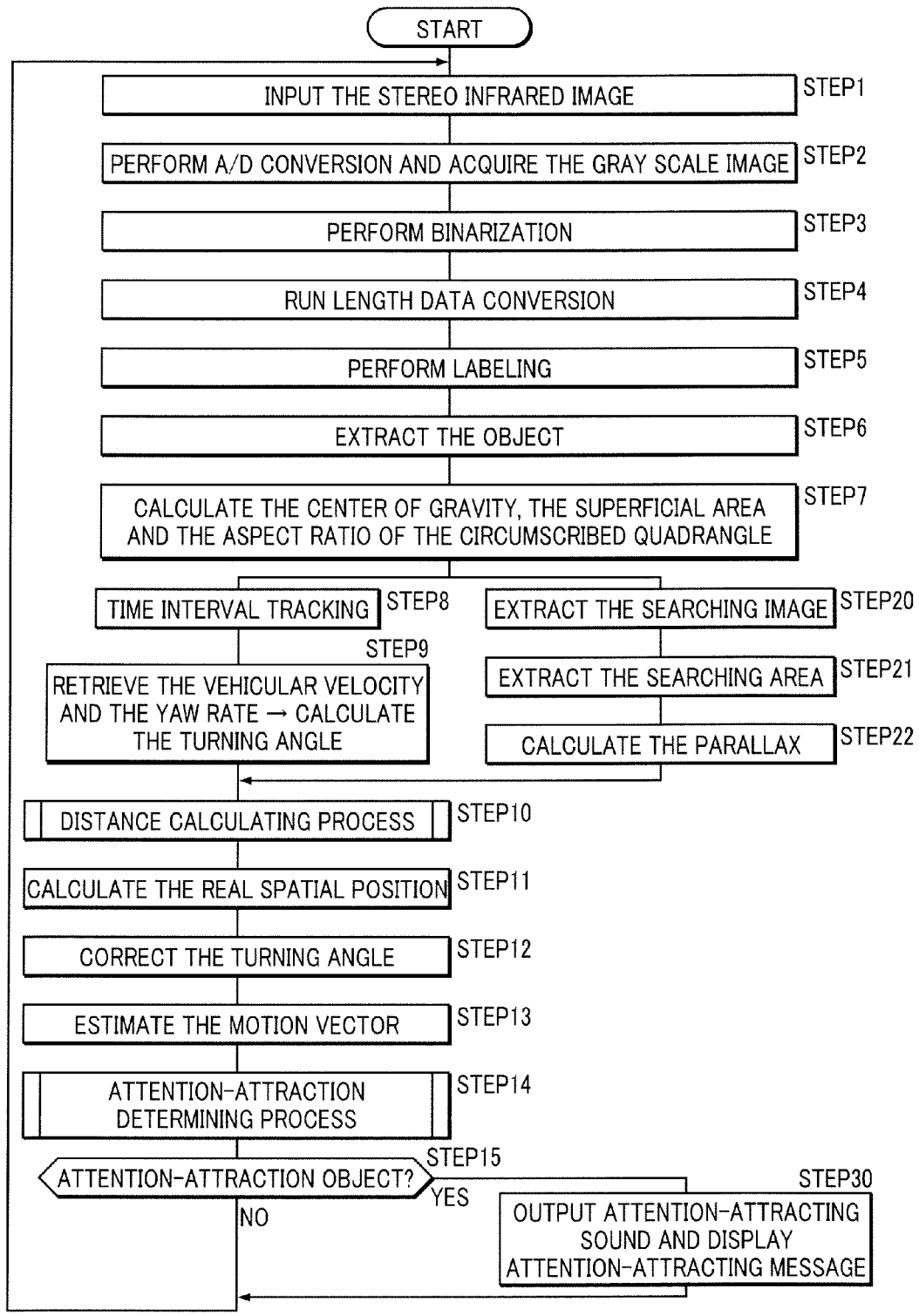
FIG. 3 is a flow chart illustrating a processing procedure performed by an image processing unit illustrated in FIG. 1.

Since the image processing unit 1 performs the periphery monitoring process according to the flow chart illustrated in FIG. 3 in the travelling of the vehicle 10, thereby, if the data of distance L(n−1) between the object and the vehicle 10 calculated in the previous control cycle has been stored in the memory, it means that the vehicle 10 is in travelling.

If it is determined that the data of distance L(n−1) between the object and the vehicle 10 calculated in the previous control cycle has been stored in the memory (not shown) at STEP 90, the procedure moves to STEP 91 where the sampling interval setting unit 23 acquires an elapsed time Δt from the calculation of the distance L(n−1) in the previous control cycle to the present time.

At STEP 92, the sampling interval setting unit 23 calculates an estimated distance Le between the object and the vehicle 10 in the current control cycle according to the following relational expression (3).

[Relational Expression 3]

$$Le = L(n-1) - VCAR \times \Delta t \quad (3)$$

Wherein, Le: the estimated distance between the object and the vehicle 10 in the current control cycle; L(n−1): the calculated distance between the object and the vehicle 10 calculated in the previous control cycle; VCAR: the vehicular velocity of the vehicle 10; Δt: the elapsed time from the calculation of the distance between the object and the vehicle 10 in the previous control cycle to the present time The sampling interval setting unit 23 applies the estimated distance Le to a relation map between the estimated distance Le and the sampling interval Tw as illustrated by a1 in FIG. 7(a) to obtain a sampling interval Tw and uses it as the sampling interval Tw in the current control cycle. In the present case, the shorter the distance between the object and the vehicle 10 is, the shorter the sampling interval will be set.

Thus, the sampling interval Tw is set shorter as the object approaches to the vehicle 10. As illustrated by a2 in FIG. 7(a), compared with the case where the sampling interval Tw is set constant so as to maintain the calculation accuracy of the distance to a distant object, the distance between the object and the vehicle 10 can be calculated rapidly, enabling the detection of the object. Moreover, since only a small number of captured images are needed in the sampling interval Tw, it is possible to alleviate the computation load of the image processing unit 1 in the distance calculation.

In the present embodiment, the sampling interval Tw is set shorter as the estimated distance between the object and the vehicle 10 calculated according to the above expression (3) becomes shorter; however, it is also acceptable to set the sampling interval Tw shorter as the calculated distance L(n−1) between the object and the vehicle 10 in the previous control cycle becomes shorter.

Since an error may exist in the estimated distance Le or the calculation distance L(n−1), it is also acceptable to set the sampling interval Tw stepwise as illustrated by a3 in FIG. 7(a) in consideration of the error.

It is further acceptable to set a coefficient k1 (0<k≦1) which decreases as the estimated distance Le becomes shorter as illustrated in FIG. 7(b), and to set the sampling interval Tw in the current control cycle by multiplying a sampling interval initial value which is preliminarily set on the assumption that the distance between the object and the vehicle is long by the coefficient k1.

On the other hand, if it is determined that the data of distance L(n−1) between the object and the vehicle 10 calculated in the previous control cycle has not been stored in the memory (not shown) at STEP 90, the procedure branches to STEP 100 where the sampling interval setting unit 23 acquires the vehicular velocity VCAR detected by the vehicular velocity sensor 4.

Subsequently at STEP 101, the sampling interval setting unit 23 applies the vehicular velocity VCAR to a relation map between the vehicular velocity VCAR and the sampling interval Tw as illustrated by b1 in FIG. 7(c) to obtain a sampling interval Tw and uses it as the sampling interval Tw in the current control cycle. In the present case, the slower the vehicular velocity of the vehicle 10 is, the shorter the sampling interval will be set.

Herein, as the case where the vehicular velocity is slow, it is assumed that the vehicle is travelling on a narrow road in urban areas, and it is possible that a pedestrian may rush out from the sideways thereof. Thereby, by setting the sampling interval Tw shorter as the vehicular velocity is slower, it is possible to shorten the calculation time of the distance to the pedestrian so as to inhibit a time lag from occurring in the detection of the pedestrian.

The procedure moves to STEP 94 only after the sampling interval setting unit 23 has acquired the time-series images in a time interval equal to or longer than the sampling interval Tw set in STEP 92 or STEP 101 at STEP 93. The process at STEP 94 is performed by the first distance calculating unit 25. The first distance calculating unit 25 calculates the distance between the object and the vehicle 10 by using the parallax gradient at STEP 94, and the procedure moves to STEP 95 and returns back to the flow chart in FIG. 3.

Hereinafter, with reference to the flow chart illustrated in FIG. 8, the process performed by the first distance calculating unit 25 at STEP 94 in FIG. 6 will be described.

At STEP 50, the first distance calculating unit 25 performs an outlier elimination process which eliminates those data without a calculated parallax (when the correlation computation by the corresponding image extracting unit 21 has failed or the like) and those data with the parallax extremely deviated from the others from the parallax time-series data calculated by the parallax calculating unit 22 in a predetermined time-series time interval Ts (for example, in 1 second).

At STEP 51, the first distance calculating unit 25 determines the reliability of the parallax time-series data on the basis of the numbers of the parallax time-series data, the degree of correlation in the correlation computation for the parallax and the like. If the parallax time-series data is determined to be reliable at STEP 52, the procedure moves to STEP 53. On the opposite, if the parallax time-series data is determined to be unreliable at STEP 52, the procedure branches to STEP 60 where the contact determining process by the contact determining unit 28 on the basis of the current parallax time-series data is prohibited.

At STEP 53, the first distance calculating unit 25 calculates the parallax gradient on the basis of the parallax time-series data, and estimates the distance from the vehicle 10 to the object on the basis of the parallax gradient at STEP 54. The distance estimating process at STEP 54 will be described in detail hereinafter.

The process at STEP 55 is performed by the distance reliability determining unit 27. The distance reliability determining unit 27 compares the distance Z1 from the vehicle 10 to the object calculated by the first distance calculating unit 25 by using the parallax gradient and the distance Z2 from the vehicle 10 to the object calculated by the second distance calculating unit 26 according to the relational expression (1) by using, for example, an intermediate value of the parallax time-series data.

When the difference between Z1 and Z2 is out of a predetermined range (intrinsic range of the vehicle 10 varying according to the mounting precision of the infrared cameras 2R and 2L, the vibration of the vehicle and the like), the distance reliability determining unit 27 determines that the parallax offset α is greater and the reliability of Z1 is low. If the reliability of Z1 is determined to be low by the distance reliability determining unit 27 at STEP 56, the procedure branches to STEP 60. On the other hand, if the reliability of Z1 is determined to be high at STEP 56, the procedure moves to STEP 57 where the contact determining unit 28 performs the contact determining process after STEP 11 of FIG. 3.

Hereinafter, the distance estimating procedure performed by the first distance calculating unit 25 at STEP 54 of FIG. 8 will be described with reference to FIG. 9. At STEP 70, the first distance calculating unit 25 is input with the travelling velocity VCAR of the vehicle 10 calculated by the velocity sensor 4. At STEP 71, the first distance calculating unit 25 is input with the calculated value 1a of the parallax gradient calculated at STEP 53 of FIG. 8 and the time Ts (for example, 1 second) at STEP 72.

Thereafter, the first distance calculating unit 25 repeats the loop from STEP 73 to STEP 76 to calculate the parallax corresponding to the calculated value Ia of the parallax gradient. FIG. 5(b) illustrates the variation between the parallax and the parallax gradient satisfying conditions that the parallax offset α=0 and the vehicle 10 is travelling at 100 km/h with respect to a motionless object. The parallax is set as the left vertical axis, the parallax gradient is set as the right vertical axis and the time is set as the horizontal axis. In the drawing, e1 represents the parallax time-series data (theoretical parallax time-series data), and e2 represent the parallax gradient (theoretical parallax gradient).

In the loop from STEP 73 to STEP 76, the first distance calculating unit 25 sets the sampling time interval Tw of the parallax by shifting the sampling time Ts (for example, 1 second) from 5 second of FIG. 5(b) to 0 second (for example, 4~5 second, 3.5~4.5 second, 3.0~4.0 second, 2.5~3.5 second, . . . ) at STEP 73, and generates theoretical parallax time-series data in the sampling time interval Tw on the basis of the velocity VCAR of the vehicle 10 and the sampling time interval Tw at STEP 74.

At STEP 75, the first distance calculating unit 25 calculates the theoretical value It of the parallax gradient on the basis of the theoretical parallax time-series data in each sampling time interval Tw, and determines whether or not the calculated value Ia of the parallax gradient is equal to or greater than the theoretical value It at STEP 76.

If the calculated value Ia of the parallax gradient is equal to or greater than the theoretical value It at STEP 76, the procedure leaves the loop and moves to STEP 77. If the calculated value Ia of the parallax gradient is smaller than the theoretical value It, the procedure returns to STEP 73 where a subsequent sampling time interval Tw is set to perform the steps after the STEP 74.

At STEP 77, the first distance calculating unit 25 acquires a parallax dx_t corresponding to the last theoretical value It of the parallax gradient calculated in the loop from STEP 73 to STEP 76. For example, as illustrated in FIG. 5(b), when the calculated value Ia of the parallax gradient is 150, 9.0 is acquired as the parallax of the theoretical time-series data in 3.0 second which is the intermediate value of the sampling time interval Tw (2.5~3.5 second) where the calculated value Ia of the parallax gradient is equal to or greater than the theoretical value It.

At STEP 78, the first distance calculating unit 25 assigns the parallax of 9.0 into the relational expression (1) to calculate the distance between the vehicle and the object.

Figure 10:
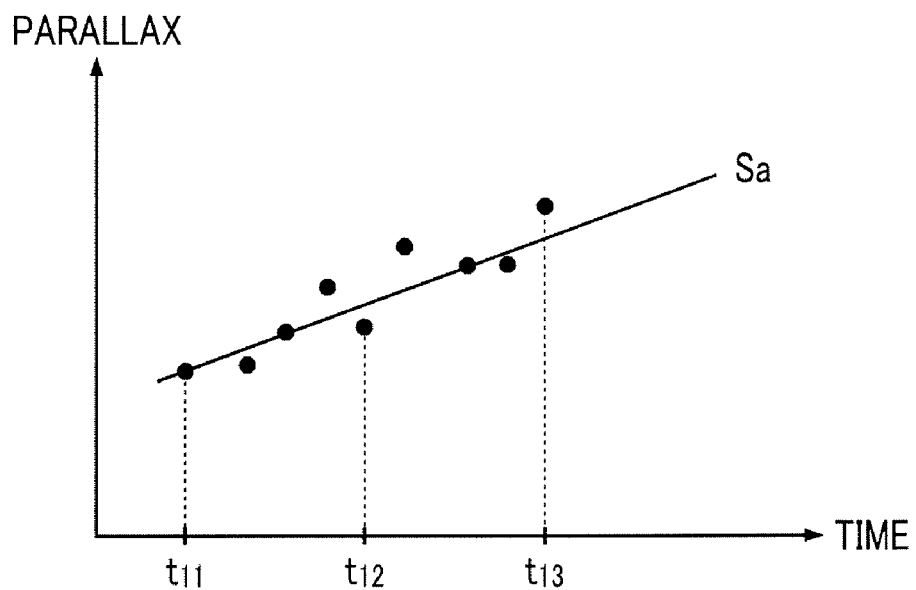
FIG. 10 is an explanatory diagram for obtaining a distance to the object on the basis of the parallax gradient.
Figure 10:
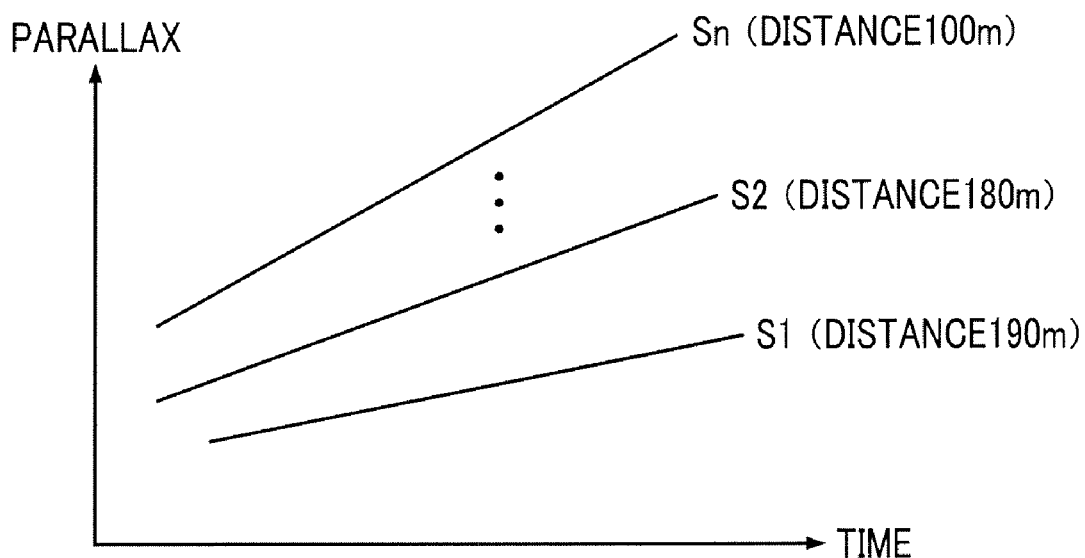

Hereinafter, another embodiment where the distance between the vehicle and the object is estimated from the parallax gradient is described with reference to FIG. 10 and FIG. 11.

FIG. 10(a) and FIG. 10(b) illustrate the distribution of the parallax time-series data with the parallax set as the vertical axis and the time set as the horizontal axis. In FIG. 10(a), a straight line Sa is obtained from 9 calculated parallax data in the sampling time interval from t11 to t13.

FIG. 10(b) illustrates straight lines having the theoretical parallax gradient when the parallax offset α=0 for each of the distances from the vehicle to the object. S1 is a straight line with the distance set at 190 m. S2 is a straight line with the distance set at 180 m. Sn is a straight line with the distance set at 100 m.

The first distance calculating unit 25 selects a straight line having the same parallax gradient as that of the straight line Sa generated from the parallax time-series data as illustrated in FIG. 10(a) from the straight lines of S1 to Sn illustrated in FIG. 10(b), and the distance for the selected straight line can be obtained as the distance from the vehicle 10 to the object.

Figure 11:
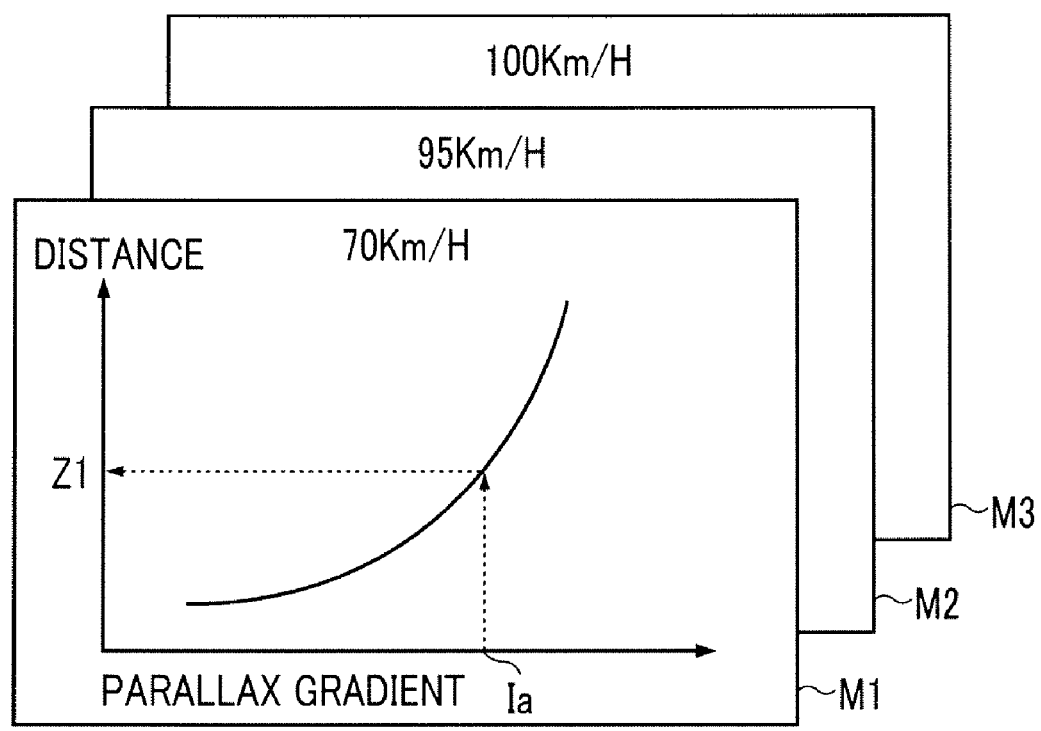
FIG. 11 is an explanatory diagram for obtaining a distance to the object on the basis of the parallax gradient.

FIG. 11 illustrates preliminarily prepared correlation maps M1, M2, M3, . . . between the parallax gradient and the distance to the object for every travelling velocity of the vehicle 10 (in FIG. 11, 70 km/h, 95 km/h and 100 km/h). The first distance calculating unit 25 applies the parallax gradient calculated from the parallax time-series data to the correlation map selected according to the travelling velocity of the vehicle 10 to obtain the distance from the vehicle 10 to the object.

For example, when the travelling velocity of the vehicle 10 is 70 km/h and the parallax gradient calculated from the parallax time-series data is Ia, the first distance calculating unit 25 obtains the distance Z1 between the vehicle 10 and the object by applying the parallax gradient Ia to the selected correlation map M1 of FIG. 11.

In the abovementioned embodiments, the distance reliability determining unit 27 determines the reliability of the distance Z1 by comparing the distance Z1 between the vehicle 10 and the object calculated by the first distance calculating unit 25 by using the parallax gradient and the distance Z2 between the vehicle 10 and the object calculated by the second distance calculating unit 26 according to the relational expression (1) by using, for example, the intermediate value of the parallax time-series data; however, it is acceptable to determine the reliability of the distance Z1 according to the other methods. Hereinafter, another method for determining the reliability of the distance Z1 by the distance reliability determining unit 27 will be described.

Figure 8:
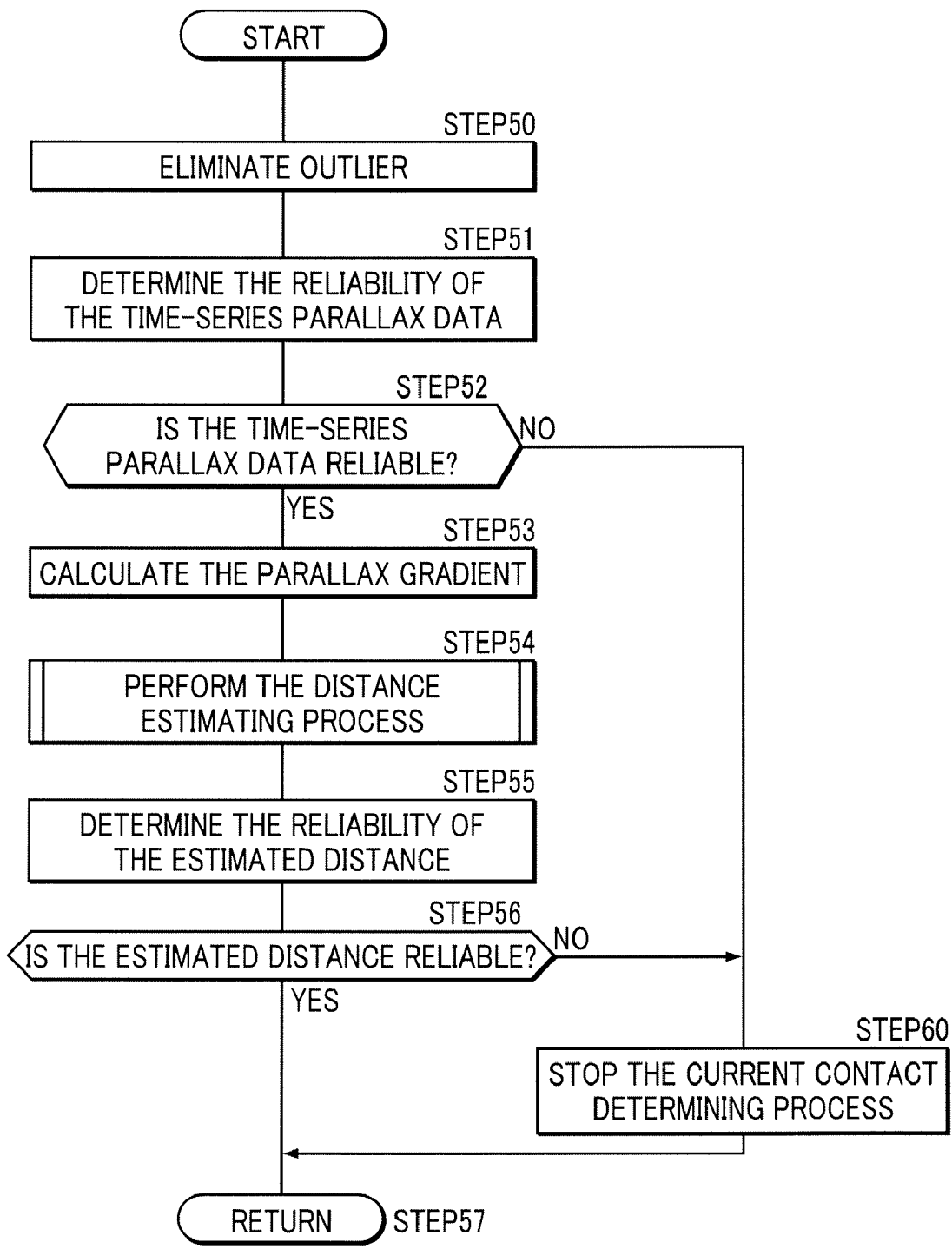
FIG. 8 is a flow chart of a procedure wherein the parallax gradient is calculated according to the determination of the reliability of a parallax time-series data, and the reliability of an estimated distance to an object is determined according to the parallax gradient.
Figure 9:
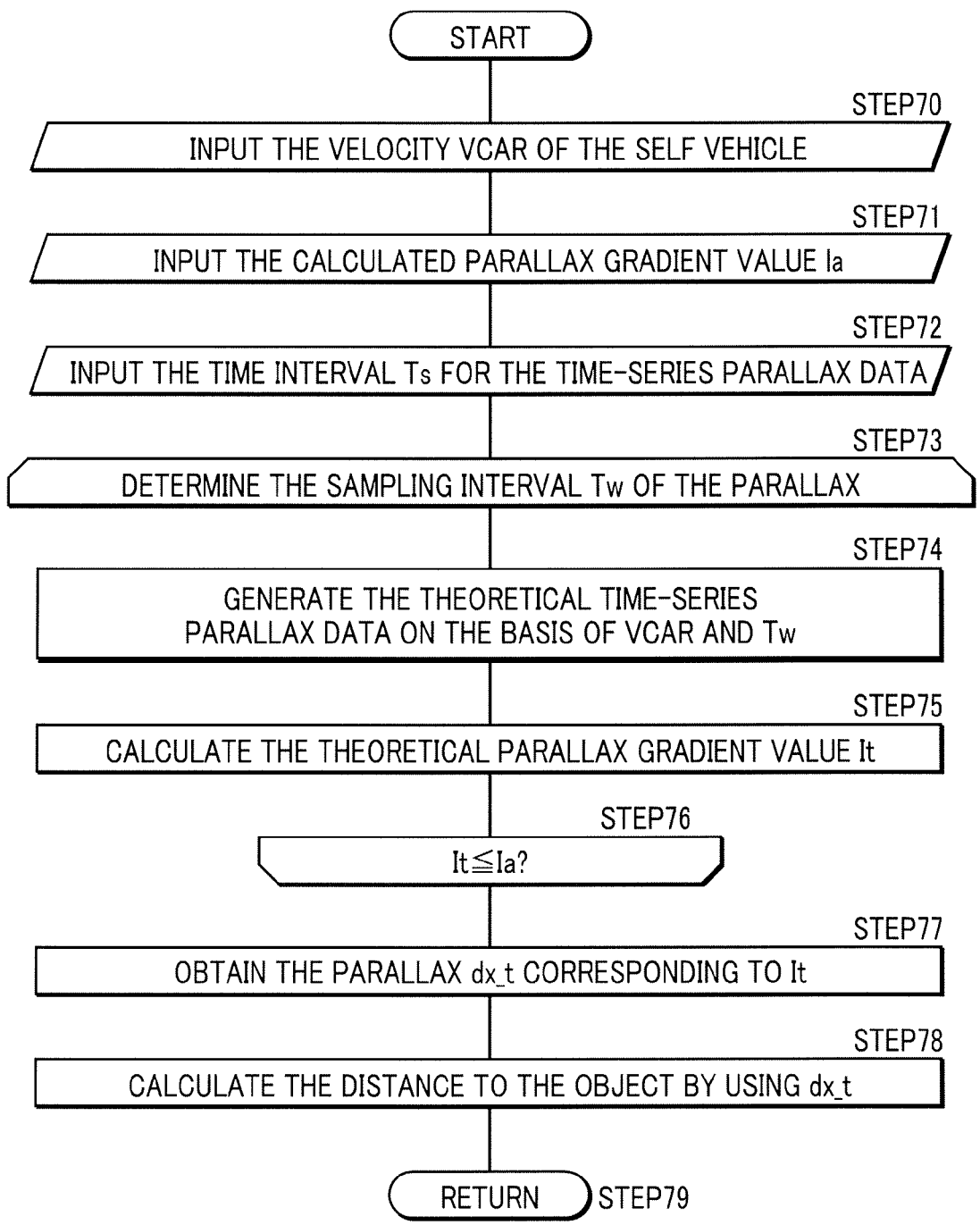
FIG. 9 is a flow chart illustrating a procedure for obtaining a distance to the object on the basis of the parallax gradient.

At STEP 55 of FIG. 8, the distance reliability determining unit 27 assigns the distance Z1 to the vehicle 10 calculated by the first distance calculating unit 25 by using the parallax gradient to the following relational expression (4) which is a reverse expression of the above-mentioned relational expression (1) to calculate an estimated parallax dx' corresponding to the distance Z1 and compares the estimated parallax dx' with the parallax dx calculated by the parallax calculating unit 22.

[Relational expression 4]

$$dx' = \frac{f}{p} \cdot \frac{D}{Z1} \qquad (4)$$

Wherein, dx': the estimated parallax, f: the focal length of the infrared cameras 2R and 2L, p: the pixel pitch of the infrared cameras 2R and 2L, D: the baseline length of the infrared cameras 2R and 2L, and Z1: the distance between the vehicle 10 and the object calculated by the first distance calculating unit 25.

When the difference between the parallax dx and the estimated parallax dx' is out of a second predetermined range (intrinsic range of the vehicle 10 varying according to the mounting precision of the infrared cameras 2R and 2L, the vibration of the vehicle and the like), the distance reliability determining unit 27 determines that the parallax offset α is greater and the reliability of Z1 is low.

When the reliability of Z1 is determined to be low by the distance reliability determining unit 27 at STEP 56, the procedure branches to STEP 60. On the other hand, when the reliability of Z1 is determined to be high at STEP 56, the procedure moves to STEP 57 where the contact determining unit 28 performs the contact determining process after STEP 11 of FIG. 3.

In the present embodiment, the present invention is provided with two infrared cameras 2R and 2L and the distance between the vehicle 10 and the object is calculated by using the parallax gradient between the image sections of the same object in the right image and the left image; however, the present invention is also applicable in a case where the distance between a vehicle and an object is calculated by using a variation rate on dimensions of image sections of the same object in time-series images captured by a single camera as disclosed in Japanese Patent Laid-open No. 2007-213561, for example.

In this case, it is acceptable to set the sampling interval of the two images (the time interval between two times for capturing the two images) for calculating the variation rate on dimensions of image sections of the same object shorter as the vehicular velocity becomes slower or set the sampling interval in the current control cycle shorter as the distance between the object and the vehicle calculated in the previous control cycle becomes shorter. It is also acceptable to calculate the estimated distance between the object and the vehicle in the current control cycle by using the distance between the object and vehicle calculated in the previous control cycle, the vehicular velocity and the elapsed time from the calculation of the distance between the object and the vehicle in the previous control cycle to the present time and set the sampling period of two images in the current control cycle shorter as the estimated distance becomes shorter.

In the embodiments of the present invention, it is configured to image the front side of the vehicle; however, it is acceptable to image the other directions, for example, the back side or the lateral sides of the vehicle to determine the contact possibility to the object.

In the embodiments of the present invention, the infrared cameras 2R and 2L are used as the imaging units; however, a visual camera for imaging a visual image may also be used.

INDUSTRIAL APPLICABILITY

As mentioned in the above, since the vehicle periphery monitoring device of the present invention can inhibit a time lag from occurring in calculating a distance between an object and a vehicle on the basis of time-series images of the object, it is useful in monitoring a periphery of the vehicle.

What is claimed is:

1. A vehicle periphery monitoring device configured to monitor a periphery of a vehicle on the basis of an image captured by an imaging unit mounted in the vehicle, comprising:
 a distance calculating unit configured to calculate a distance between the vehicle and an object by using a variation degree of predetermined elements of image sections of the same object among a plurality of images captured by the imaging unit at different times within a predetermined sampling interval for each predetermined control cycle;
 a vehicular velocity detecting unit configured to detect a vehicular velocity of the vehicle; and
 a sampling interval setting unit configured to calculate an estimated distance between the vehicle and the object in a current control cycle by using the distance between the vehicle and the object calculated by the distance calculating unit in a previous control cycle, the vehicular velocity of the vehicle, and an elapsed time from the time point when the distance between the vehicle and the object is calculated in the previous control cycle, and to set the sampling interval in the current control cycle shorter as the estimated distance is shorter.

2. The vehicle periphery monitoring device according to claim 1, wherein
 the sampling interval setting unit is configured to set the sampling interval shorter as the vehicular velocity of the vehicle is slower.

* * * * *